US012672217B2

(12) United States Patent
Peng

(10) Patent No.: US 12,672,217 B2
(45) Date of Patent: Jun. 30, 2026

(54) LIGHT-EMITTING DIODE CIRCUIT WITH PARALLEL SEQUENCE FUNCTION, LIGHT-EMITTING DIODE LAMP, AND LIGHT-EMITTING DIODE LIGHT STRING

(71) Applicant: SEMISILICON TECHNOLOGY CORP., New Taipei City (TW)

(72) Inventor: Wen-Chi Peng, New Taipei City (TW)

(73) Assignee: SEMISILICON TECHNOLOGY CORP., New Taipei City (TW)

( * ) Notice: Subject to any disclaimer, the term of this patent is extended or adjusted under 35 U.S.C. 154(b) by 202 days.

(21) Appl. No.: 18/405,266

(22) Filed: Jan. 5, 2024

(65) Prior Publication Data

US 2024/0163993 A1 May 16, 2024

Related U.S. Application Data

(63) Continuation-in-part of application No. 17/366,257, filed on Jul. 2, 2021, now Pat. No. 11,950,338.

(51) Int. Cl.

| | |
|---|---|
| ***H05B 45/48*** | (2020.01) |
| ***H05B 45/305*** | (2020.01) |
| ***H05B 45/3725*** | (2020.01) |

(52) U.S. Cl.

CPC ....... *H05B 45/3725* (2020.01); *H05B 45/305* (2020.01); *H05B 45/48* (2020.01)

(58) Field of Classification Search

CPC ... H05B 45/3725; H05B 45/305; H05B 45/48

See application file for complete search history.

(56) References Cited

U.S. PATENT DOCUMENTS

| | | | | |
|---|---|---|---|---|
| 2011/0084621 | A1 | 4/2011 | Ko et al. | |
| 2012/0299492 | A1 | 11/2012 | Egawa et al. | |
| 2014/0062321 | A1 | 3/2014 | McMahon | |
| 2014/0159586 | A1 | 6/2014 | Kido | |
| 2016/0338171 | A1* | 11/2016 | Bhagat ................ | F21V 23/0471 |
| 2016/0381760 | A1 | 12/2016 | Xiong et al. | |

FOREIGN PATENT DOCUMENTS

| | | | |
|---|---|---|---|
| CN | 101489331 | A | 7/2009 |
| CN | 201682659 | U | 12/2010 |
| CN | 104936342 | A | 9/2015 |
| CN | 105101521 | A | 11/2015 |
| CN | 204795757 | U | 11/2015 |
| JP | 2011090849 | A * | 5/2011 |
| TW | 200932054 | A | 7/2009 |
| TW | 202245547 | A | 11/2022 |

OTHER PUBLICATIONS

Office Action dated Jan. 15, 2025 of the parent patent's corresponding China patent application No. 202110551027.X.

Office Action dated Oct. 16, 2024 of the corresponding Taiwan patent application No. 112145619.

* cited by examiner

*Primary Examiner* — Henry Luong

(74) *Attorney, Agent, or Firm* — MUNCY, GEISSLER, OLDS & LOWE, P.C.

(57) ABSTRACT

A light-emitting diode (LED) circuit with a parallel sequence function is connected to a power wire in parallel. The LED circuit includes a sequence circuit. In a sequence mode, a first specific voltage is generated by receiving a resistance of the power wire and a pulse cluster with a specific frequency is received. The sequence circuit uses the first specific voltage and the pulse cluster to determine a value, and then sets the value to a sequence number of the LED circuit.

16 Claims, 14 Drawing Sheets

LIGHT-EMITTING DIODE CIRCUIT WITH PARALLEL SEQUENCE FUNCTION, LIGHT-EMITTING DIODE LAMP, AND LIGHT-EMITTING DIODE LIGHT STRING

CROSS-REFERENCE TO RELATED APPLICATION

This application is a continuing-in-part application of U.S. patent application Ser. No. 17/366,257, filed on Jul. 2, 2021, and entitled “PARALLEL SEQUENCED LED LIGHT STRING”. The entire disclosures of the above application are all incorporated herein by reference.

BACKGROUND

Technical Field

The present disclosure relates to a light-emitting diode circuit, a light-emitting diode lamp, and a light-emitting diode light string, and more particularly to a light-emitting diode circuit with a parallel sequence function, a light-emitting diode lamp, and a light-emitting diode light string.

Description of Related Art

The statements in this section merely provide background information related to the present disclosure and do not necessarily constitute prior art.

According to the current technology, in order to drive the light-emitting diodes (LEDs) of the light-emitting diode (LED) light string to emit light in a variety of ways, the LEDs have different address sequence data (i.e., sequence numbers). The LEDs receive lighting signals including lighting data and address data. If the address sequence data of the LED is the same as the address data of the lighting signal, the LED emits light according to the lighting data of the lighting signal. On the contrary, if the address sequence data of the LED is different from the address data of the lighting signal, the LED skips/ignores the lighting data of the lighting signal.

At present, most of the sequence methods of the LEDs of the LED light string are complicated or difficult. For example, before the LEDs are assembled into the LED light string, different address sequence data need to be programmed (burned) into each LED. Afterward, the LEDs are placed sequentially according to the address sequence data and assembled into the LED light string. If the LEDs are not placed sequentially according to the address sequence data, the diverse lighting of the LEDs cannot be correctly achieved. In addition, the current sequence method of the LEDs in the LED light string usually requires traditional manual programming (burning) to sequence, thereby causing a lot of waste of time. Moreover, when using the traditional manual programming sequence method, the product cannot be sequenced again after it leaves the factory. Therefore, after the LED light string leaves the factory, if some LEDs are damaged and replaced, they cannot be repaired by themselves.

Therefore, how to design a light-emitting diode circuit with a parallel sequence function, a light-emitting diode lamp, and a light-emitting diode light string to solve the problems and technical bottlenecks in the existing technology has become a critical topic in this field.

SUMMARY

In order to solve the above-mentioned problems, the present disclosure provides a light-emitting diode (LED)

circuit with a parallel sequence function. The LED circuit is connected to a power wire in parallel. The LED circuit includes a sequence circuit. The sequence circuit receives a first specific voltage generated by a wire resistance of the power wire under a sequence mode, and receives a pulse cluster with a specific frequency. The sequence circuit determines a value according to the first specific voltage and the pulse cluster, and then sets the value to a sequence number of the light-emitting diode circuit.

In order to solve the above-mentioned problems, the present disclosure provides a light-emitting diode (LED) lamp. The LED lamp includes two power pins, a plurality of light-emitting diodes, a light-emitting diode circuit, and a package. The two power pins receive an input power source with a first specific voltage. The plurality of LEDs is coupled to the two power pins. The LED circuit is coupled to the two power pins and the plurality of LEDs, and the LED circuit receives the input power source through the two power pins. The package packages the LED circuit, the plurality of LEDs, and the two power pins, wherein each power pin is partially exposed outside the package.

In order to solve the above-mentioned problems, the present disclosure provides a light-emitting diode (LED) light string with a parallel sequence function. The LED light string includes a power wire, a power setting circuit, and a plurality of LED circuits. The power wire includes an input terminal, a positive power wire, and a negative power wire. The input terminal receives an input power source, and the power wire includes a wire resistance. The power setting circuit is coupled to the power wire, and the power setting circuit provides a path from the input terminal, the positive power wire, and the negative power wire to the input terminal for the input power source, and adjusts a current of the input power source to a constant current. Each LED circuit is coupled to the power wire and the power setting circuit in parallel. In a sequence mode, a plurality of wire resistances is provided between the input terminal and the plurality of LED circuits. When the constant current flows through the plurality of wire resistances, a plurality of sequence circuits of the LED circuits respectively receive a plurality of first specific voltages with different voltage magnitudes according to a parallel sequence of the LED circuits, and receive the pulse cluster with a specific frequency to compare the first specific voltage with the pulse cluster to correspondingly set a sequence number of the LED circuit.

The main purpose and effect of the present disclosure is that the LED light string automatically sequences the LED circuits through the sequence circuits of the LED circuits. It is mainly to use to the comparison circuit to compare the first specific voltage received by the LED circuit with the pulse cluster. If the first specific voltage meets the value corresponding to the pulse cluster, the sequence circuit sets the value of the pulse cluster to the sequence number of the LED circuit. Therefore, the LED circuit can be provided with the automatic sequence function, thereby saving a large amount of programming (burning) time.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
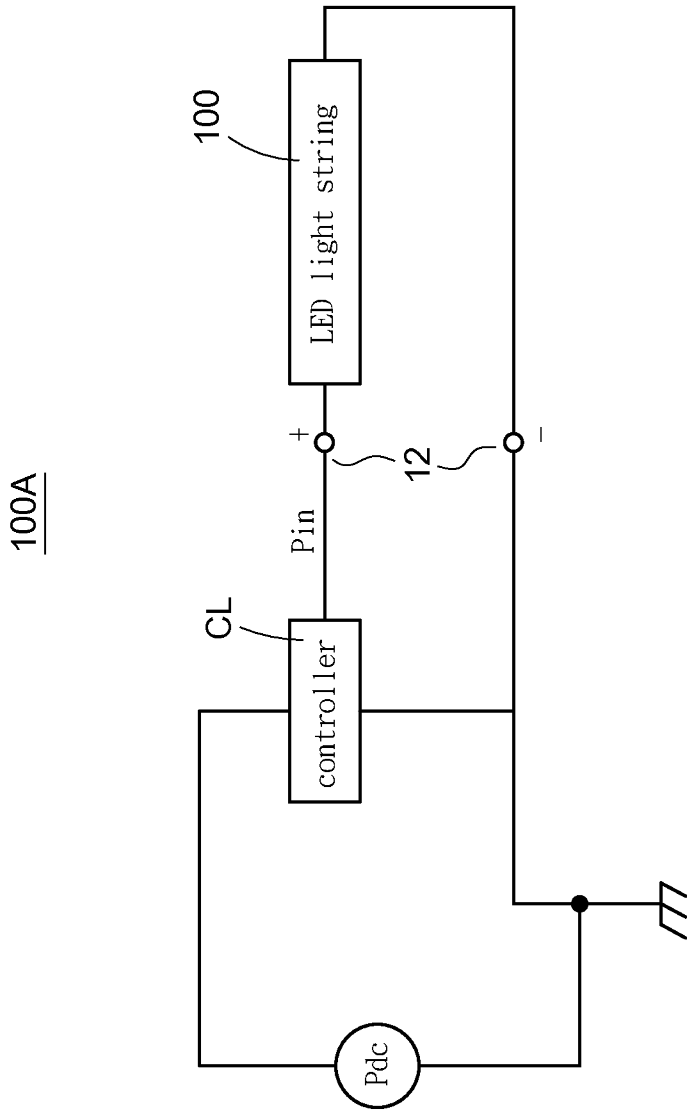
FIG. 1A is a system block diagram of a light-emitting diode (LED) light string control system with a parallel sequence function according to the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a system block diagram of a light-emitting diode (LED) light string control system with a parallel sequence function according to the present disclosure. The LED light string control system 100A receives a direct-current (DC) power source Pdc, and the LED light string control system 100A includes a controller CL and a LED light string 100. The LED light string 100 is coupled to the controller CL through an input terminal 12, and the controller CL converts the DC power source Pdc into an input power source Pin, and provides the input power source Pin to the input terminal 12 of the LED light string 100 to supply power to the LED light string 100.

Figure 1B:
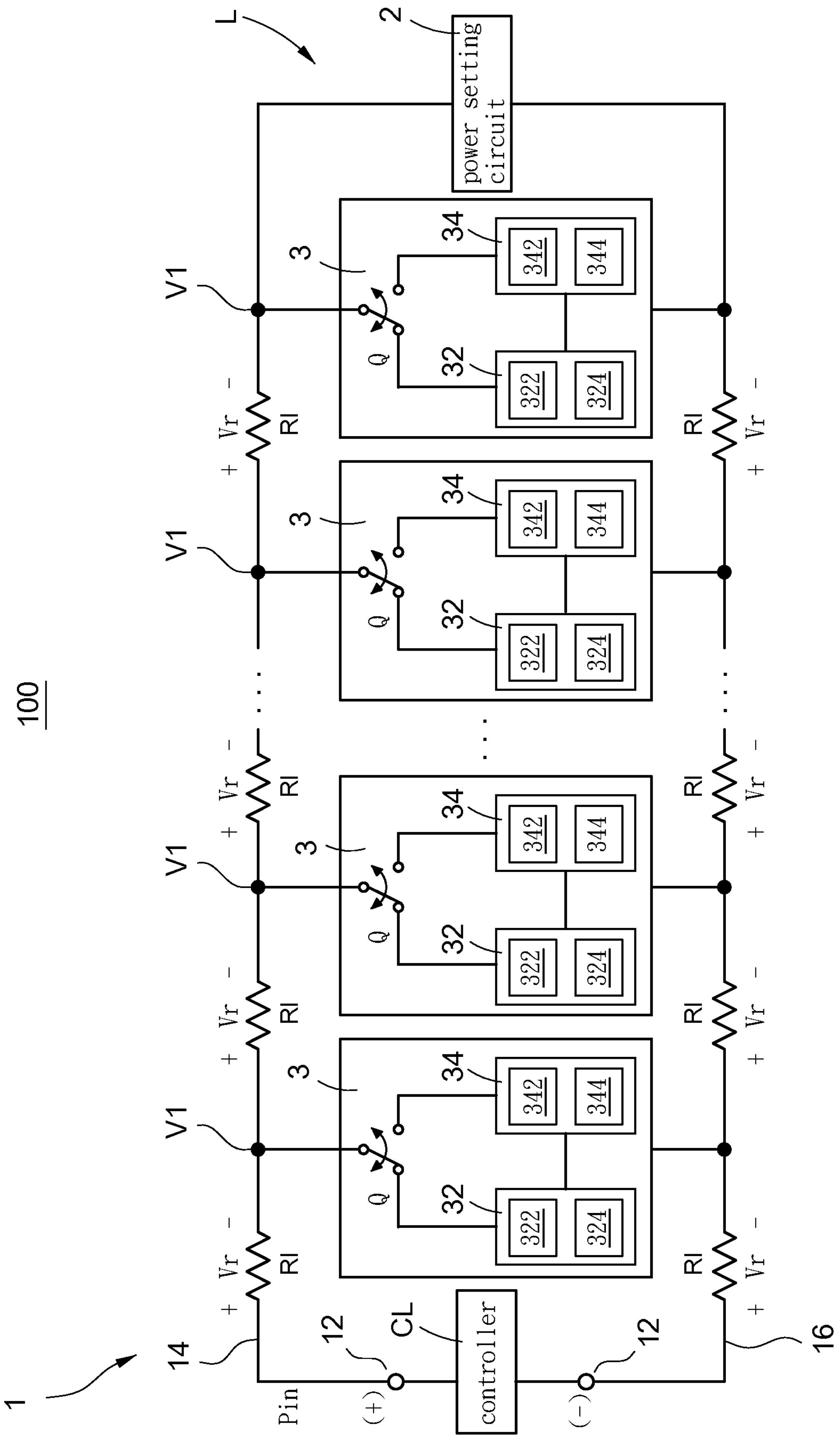
FIG. 1B is a circuit block diagram of the LED light string with the parallel sequence function according to a first embodiment of the present disclosure.

Please refer to FIG. 1B, which shows a circuit block diagram of the LED light string with the parallel sequence function according to a first embodiment of the present disclosure, and also refer to FIG. 1A. The LED light string 100 includes a power wire 1, a power setting circuit 2, and a plurality of LED circuits 3. The power wire 1 includes an input terminal 12, a positive power wire 14, and a negative power wire 16. The positive power wire 14 is coupled to a positive electrode (+) of the input power source Pin through the input terminal 12, and the negative power wire 16 is coupled to a negative electrode (−) of the input power source Pin through the input terminal 12. Two terminals of the power setting circuit 2 are coupled to the positive power wire 14 and the negative power wire 16 respectively. The input power source Pin may be supplied power by a front-stage controller (not shown) based on a control command. Therefore, the input power source Pin may be any form of DC power source such as DC voltage, pulse power source, carrier power source, or constant current source. The plurality of LED circuits 3 are respectively connected to the power wire 1 and the power setting circuit 2. Specifically, one terminal of each LED circuit 3 is coupled to the positive power wire 14, and the other terminal of each LED circuit 3 is coupled to the negative power wire 16. The power setting circuit 2 is mainly used to adjust a current of the input power source Pin to a constant current. When the LED light string 100 is coupled to the input power source Pin through the power wire 1, each LED circuit 3 inside the LED light string 100 can be sequenced so that each LED circuit 3 acquires a sequence number corresponding to its self-arranged position (such as but not limited to 1, 2, 3, . . . etc.). Afterward, the controller CL drives the LED circuits to perform a specific lighting behavior according to the sequence number so that the LED light string 100 can produce visual effects of color changes based on the specific lighting behavior of each LED circuit 3.

In general, each LED circuit 3 includes a sequence circuit 32 and a work circuit 34, and the sequence circuit 32 receives the input power source Pin through the power wire 16. Taking a single LED circuit 3 as an example, a wire resistance Rl is included between the input terminal 12 and the LED circuit 3. When the constant current flows through the wire resistance Rl, a specific voltage V1 is generated. When the sequence circuit 32 receives the first specific voltage V1 and a pulse cluster with a specific frequency, the sequence circuit 32 determines a value according to the first specific voltage V1 and the pulse cluster, and then the sequence circuit 32 can set the sequence number of the LED circuit 3 according to the value, and details are described later.

Specifically, the sequence circuit 32 includes a count circuit 322 and a comparison circuit 324, and operation modes of the LED circuit 3 include a sequence mode and a work mode. The work circuit 324 of each LED circuit 3 includes a LED module 342 having one or more than one LEDs to generate at least one light source (such as but not limited to, red light, blue light, etc.). In the sequence mode, for example but not limited to, the LED light string 100 has just been connected to the input power source Pin, the LED light string 100 disables the work circuit so that two terminals of the work circuit 34 are disconnected, that is, a path between the positive power wire 14 and the negative power wire 16 through the work circuit 34 is disconnected. After the sequencing of the LED circuits 3 is completed, the sequence circuit 32 can provide the set sequence number to the work circuit 34 and the set sequence number is stored in the work circuit 34. Afterward, the operation mode of the LED light string 100 can be switched to the work mode from the sequence mode.

In the work mode, the input power source Pin may usually be the carrier power source including lighting commands, and the carrier power source may a pulse cluster power source composed of high-level voltage and low-level voltage combined in a specific sequence. In the work mode, the work circuit 34 can correspondingly acquire the lighting commands of the carrier power source according to the sequence number. Specifically, the carrier power source usually includes the lighting command that controls each LED circuit 3, and the lighting command usually includes an address band (or a sequence number band) and a behavior band that sets each LED circuit 3 to perform a specific lighting behavior. Therefore, the work circuit 34 can access the lighting command according to the address band (or the sequence number band) in the lighting command meeting its own sequence number. Accordingly, in the work mode, the work circuit 34 can drive the LED module 342 to perform the specific lighting behavior (such as, but not limited to, flashing, full brightness, etc.) according to the corresponding lighting commands with the stored sequence numbers in the carrier power source.

Moreover, the work circuit 34 further includes, for example but not limited to, a drive circuit 344. The drive circuit 344 is coupled to the count circuit 322 and the LED module 342, and receives the input power source Pin, i.e., the carrier power source. Therefore, in the work mode, the drive circuit 344 can control the LED module 342 to perform the specific lighting behavior according to the corresponding lighting commands with the stored sequence number in the carrier power source. In particular, the work circuit 34 further includes the drive circuit 344, which is only an illustrative example, and the drive circuit 344 is not necessary to drive the LED module 342. Therefore, all devices that can be used to drive the LED module 342 (such as but not limited to, control chips and other devices) should be included in the scope of the present embodiment. Moreover, in the sequence mode, the input power source Pin is mainly a pulse cluster power source with a specific frequency or a DC voltage, which can be used to sequence the LED circuits 3. In the work mode, the input power source Pin is mainly a carrier power source, which can be used to operate the LED circuit 3 to control the specific lighting behavior of the LED module 342. Therefore, the input power source Pin can be the same or different in the sequence mode and the work mode, but it is not limited to the present embodiment.

When the LED light string 100 has just been connected to input power source Pin or one or more than one LED diode circuits 3 of the LED light string 100 are completely replaced, the LED circuit 3 has not detected its own sequence number. In this condition, each LED circuit 3 of the LED light string 100 can perform the sequence mode so that each LED circuit 3 has a correct sequence number.

As shown in FIG. 1B, each LED circuit 3 further includes a controlled switch Q (optional). The controlled switch Q is coupled between the sequence circuit 32, the work circuit 34, and the power wire 1. When the LED circuit 3 operates in the work mode, the LED circuit 3 controls the controlled switch Q to connect a coupling relationship between the work circuit 34 and the power wire 1 so that the sequence circuit 32 does not work when the LED circuit 3 operates in the work mode, thereby saving the power consumption of the LED circuit 3. On the contrary, as shown in FIG. 1B, when the LED circuit 3 operates in the sequence mode, the LED circuit 3 controls the controlled switch Q to connect a coupling relationship between the sequence circuit 32 and the power wire 1 so that the work circuit 34 does not work when the LED circuit 3 operates in the sequence mode, thereby saving the power consumption of the LED circuit 3.

On the other hand, a plurality of wire resistors Rl is also included between the input terminal 12 of the power wire 1 and the LED circuit 3. The wire resistance Rl may be caused by the wire impedance of the power wire 1, or it may be a resistor specially configured to generate the wire resistance Rl. Since a total wire resistance (i.e., the wire resistance Rl) between each sequentially arranged LED circuit 3 and the input power source Pin will vary according to its arrangement position, the total wire resistance (i.e., the wire resistance Rl) of the LED circuit 3 with a smaller sequence number will be lower, and vice versa.

Specifically, under the sequence mode, the input power source Pin is a pulse cluster power source with a specific frequency. When the sequence circuit 32 receives the input power source Pin through the power wire 1, the count circuit 322 receives the pulse cluster with the specific frequency, and counts the number of pulse waves of the pulse cluster to a value. In particular, the value means a quantity or its corresponding value, and this definition applies to the "value" disclosed below. One terminal of the comparison circuit 324 is coupled to the count circuit 322, and the other terminal of the comparison circuit 324 receives the input power source Pin. Furthermore, a constant current flows through the wire resistance Rl to generate a first specific voltage V1 with different voltage magnitudes in the sequence circuit 32 of each LED circuit 3.

Therefore, as shown in FIG. 1B, one wire resistance Rl exists on a path between the first LED circuit 3 and the input terminal 12, and two wire resistances Rl exist on a path between the second LED circuit 3 and the input terminal 12, and so on. Therefore, the first specific voltage V1 received by each LED circuit 3 is affected by different wire resistances Rl due to the sequence of the LED circuit 3. In this condition, the first specific voltage V1 of the LED circuit 3 is affected by the corresponding wire resistance Rl, and a corresponding first specific voltage V1 is generated and sequentially decreased (for example, but not limited to, 5V, 4.75V, 4.5V, . . . etc.) according to the sequence of each LED circuit 3.

In the sequence mode, when the first specific voltage V1 (for example, but not limited to, 4.75V) of one of the LED circuits (for example, but not limited to, the second LED circuit 3, i.e., the second LED circuit sequenced from the input terminal 12) of the LED light string 100 correspondingly meets the value (i.e., the number of the second pulse wave) of the pulse cluster, the comparison circuit 324 of the second LED circuit 3 controls the sequence circuit 32 to stop counting. Afterward, when the sequence circuit 32 of the second LED circuit 3 stops counting, the accumulated value of the count circuit 322 is set to the sequence number of the second LED circuit 3, that is, the sequence number is 2. Afterward, in the work mode, the work circuit 34 of the second LED circuit 3 drives the LED module 324 to perform the specific lighting behavior according to the corresponding lighting command stored the sequence number of 2. The operation mode of the remaining LED circuits 3 is the same as the above description, and will not be described again.

Please refer to FIG. 1B again, the power setting circuit 2 can be designed to be enabled under the sequence mode, and the power setting circuit 2 can be designed to be disabled under the work mode. Therefore, in the sequence mode, two terminals of the work circuit 34 are disconnected, that is, a path between the positive power wire 14 and the negative power wire 16 through the work circuit 34 is disconnected, and therefore a closed loop L is provided from the positive electrode (+) of the input power source Pin, the power wire 1, the power setting circuit 2 to the negative electrode (−) of the input power source Pin since the power setting circuit 2 is enabled (turned on). Therefore, the input power source Pin can continuously flow from the positive electrode (+), the positive power wire 14, the power setting circuit 2, the negative power wire 16 to the negative electrode (−). In other words, the closed loop L will not be disconnected due to the two terminals of the work circuit 34 being disconnected, resulting in the current being unable to continue flowing. Afterward, in the work mode, the work circuit 34 of each LED circuit 3 operates to form a path from the positive power wire 14, the work circuit 34 to the negative power wire 16, and therefore it is no longer necessary to use the closed loop L through the power setting circuit 2. Therefore, the power setting circuit 2 is disabled so that when the LED circuit 3 operates in the work mode, the power setting circuit 2 does not work to save the power consumption of the LED light string 100.

Figure 1C:
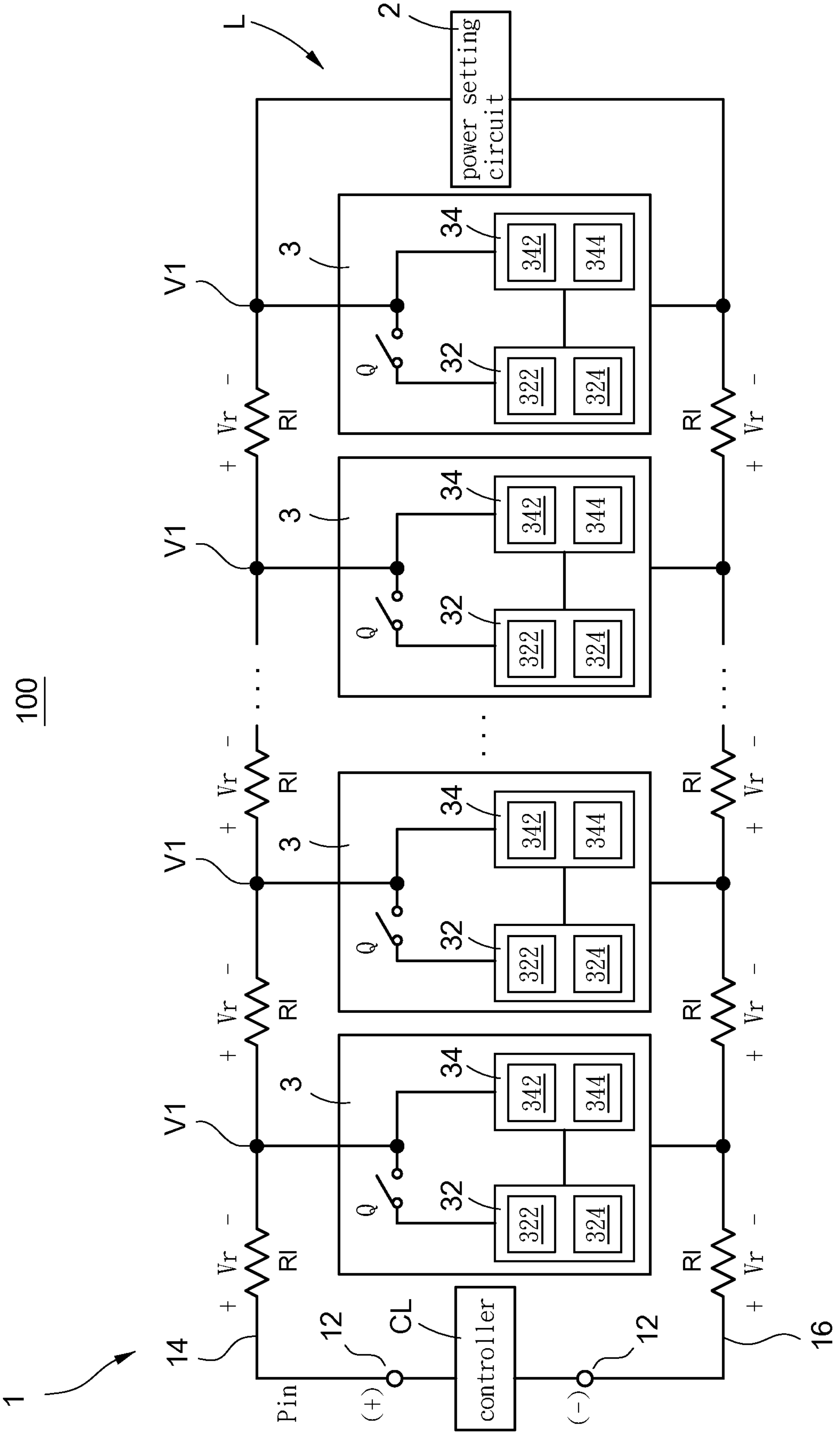
FIG. 1C is a circuit block diagram of the LED light string with the parallel sequence function according to a second embodiment of the present disclosure.

Please refer to FIG. 1C, which shows a circuit block diagram of the LED light string with the parallel sequence function according to a second embodiment of the present disclosure, and also refer to FIG. 1B. The difference between the LED light string 100 shown in FIG. 1C and the LED light string 100 shown in FIG. 1B is that the controlled switch Q is coupled between the sequence circuit 32 and the power wire 1. When the LED circuit 3 operates in the work mode, the LED circuit 3 controls the controlled switch Q to be turned off to disable the sequence circuit 32 so that the sequence circuit 32 does not work to save the power consumption of the LED circuit 3. On the contrary, when the LED circuit 3 operates in the sequence mode, the LED circuit controls the controlled switch Q to be turned on so that the sequence circuit 32 is coupled to the power wire 1. In one embodiment, the different detailed characteristics of the controlled switch Q between in FIG. 1B and FIG. 1C, and the effects that can be achieved will be further explained later, and will not be described again here.

Figure 1D:
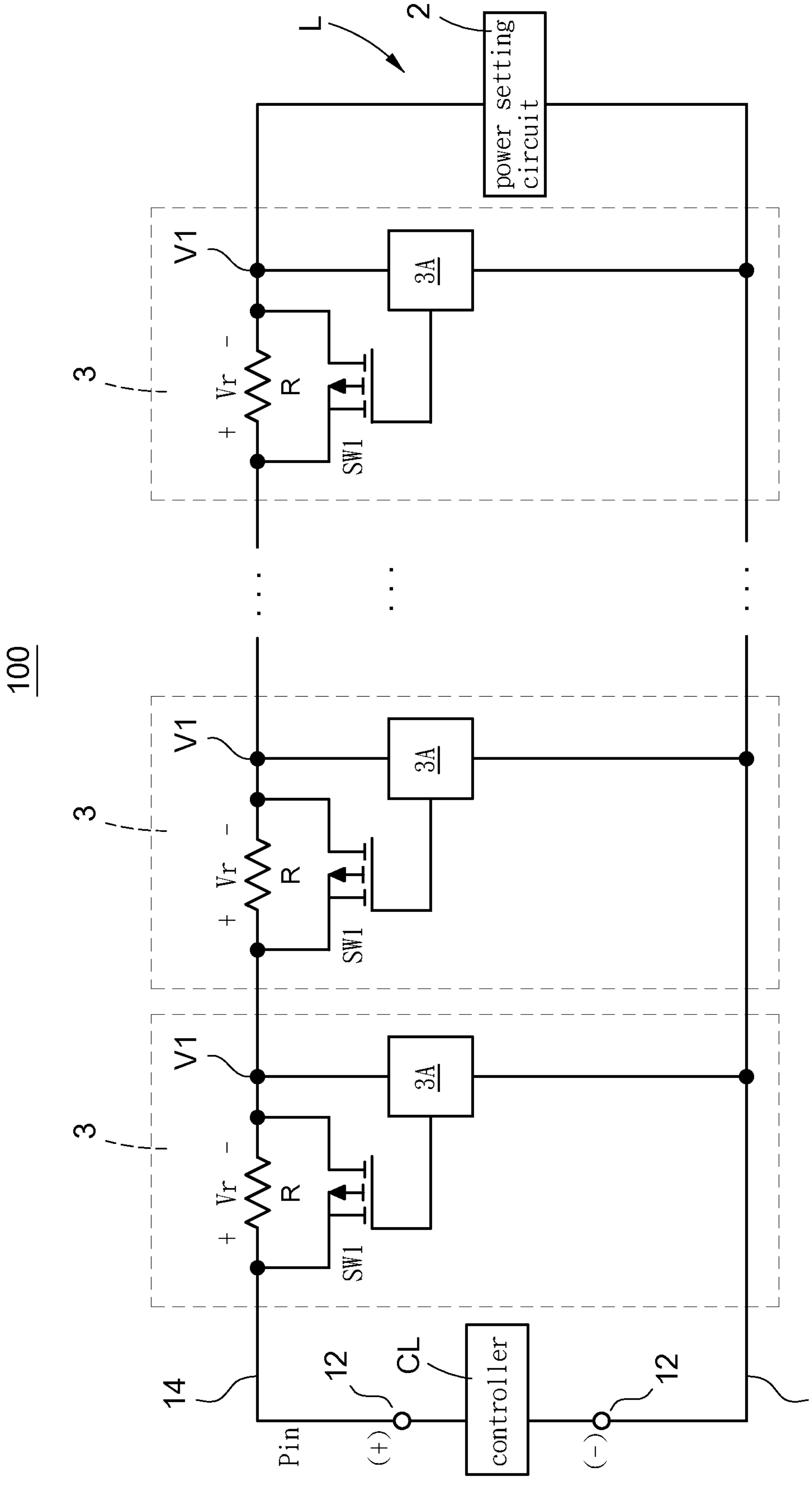
FIG. 1D is a circuit block diagram of the LED light string with the parallel sequence function according to a third embodiment of the present disclosure.

Please refer to FIG. 1D, which shows a circuit block diagram of the LED light string with the parallel sequence function according to a third embodiment of the present disclosure, and also refer to FIG. 1A to FIG. 1C. In FIG. 1D, the sequence circuit 32 and the work circuit 34 may be simply referred to as a control module 3A to facilitate a detailed description of the features of FIG. 1D. Each LED circuit 3 further includes a resistor R and a first switch SW1, and the resistor is connected to the positive power wire 14 in series. The first switch SW1 is connected to the resistor R in parallel, and is coupled to the control module 3A so that the control module 3A controls the first switch SW1 to be turned on and turned off. In particular, the first switch SW1 may be coupled to the sequence circuit 32 or the work circuit 34 to control the first switch SW1 to be turned on and turned off through the sequence circuit 32 or the work circuit 34.

Furthermore, when the wire impedance of the power wire 1 (i.e., the wire resistance Rl) is relatively small, sometimes the first specific voltage V1 does not have an obvious voltage difference, and therefore it is difficult for the sequence circuit 32 to identify. Therefore, the resistance value can be increased by adding a resistor R in the LED circuit 3 and the resistor R is connected in series to the positive power wire 14 so that the first specific voltage V1 can be acquired when the current flows. In this condition, a larger voltage difference of the first specific voltage V1 is acquired than that under a single wire resistance Rl so that it is easier for the sequence circuit 32 to confirm its own sequence number based on the first specific voltage V1. Therefore, in the sequence mode, the control module 3A controls the first switch SW1 to be turned off, and the resistance value of the wire impedance increases to the wire resistance Rl plus the resistance of the resistor R. On the contrary, after the sequence is completed, the resistor R is no longer needed to increase the resistance value. Instead, the resistor R needs to be bypassed to decrease the power consumption of the power wire 1. Therefore, the resistor R can be bypassed by turning on the first switch SW1 connected to the resistor R in parallel.

Figure 1E:
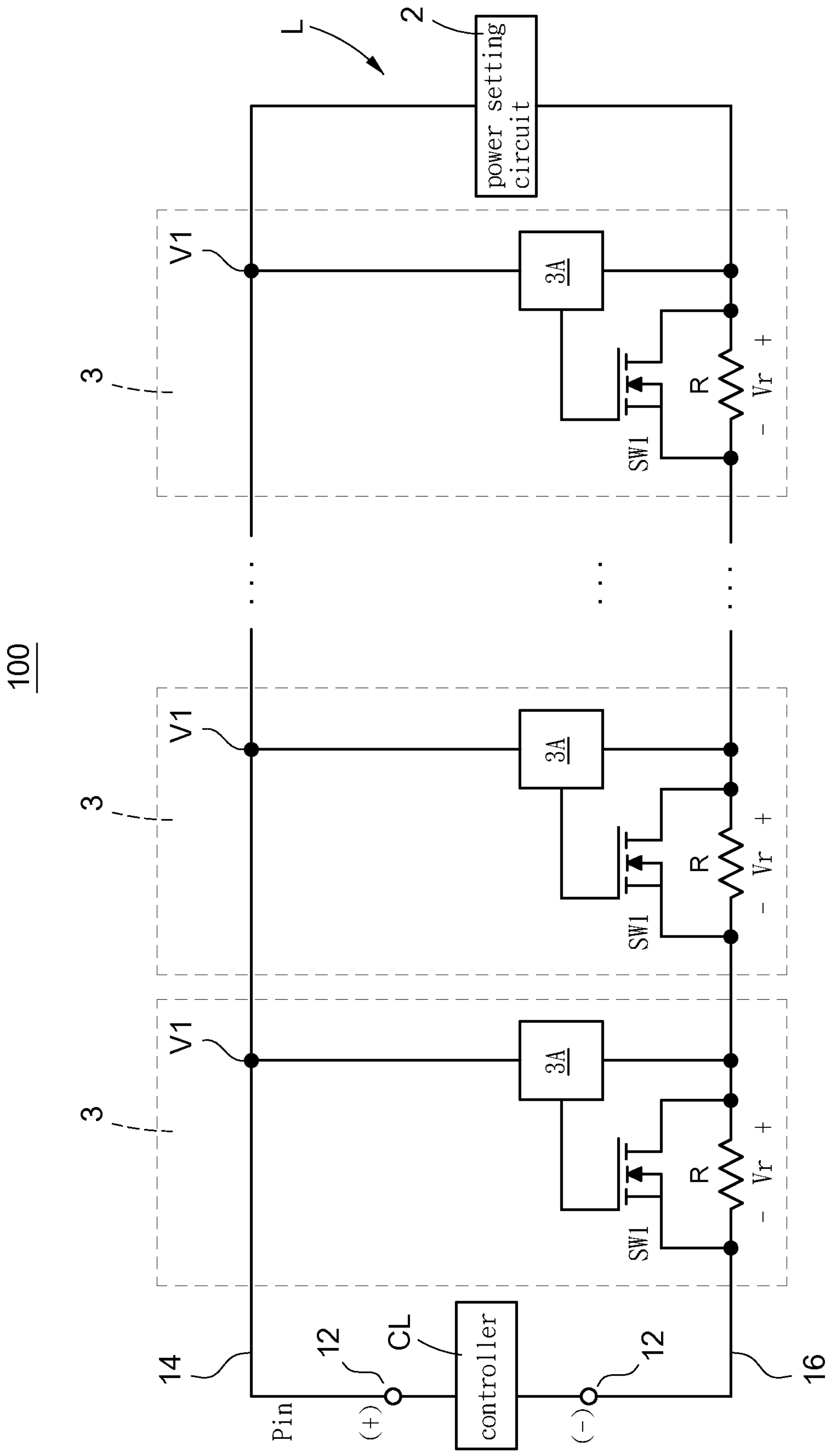
FIG. 1E is a circuit block diagram of the LED light string with the parallel sequence function according to a fourth embodiment of the present disclosure.

Please refer to FIG. 1E, which shows a circuit block diagram of the LED light string with the parallel sequence function according to a fourth embodiment of the present disclosure, and also refer to FIG. 1A to FIG. 1D. The difference between the LED light string 100 shown in FIG. 1E and the LED light string 100 shown in FIG. 1C is that the resistor R is connected to the negative power wire 16 in parallel. In particular, the circuit coupling relationship and operation principle of FIG. 1E are the same as those of FIG. 1D, and their details will not be repeated here.

Figure 2A:
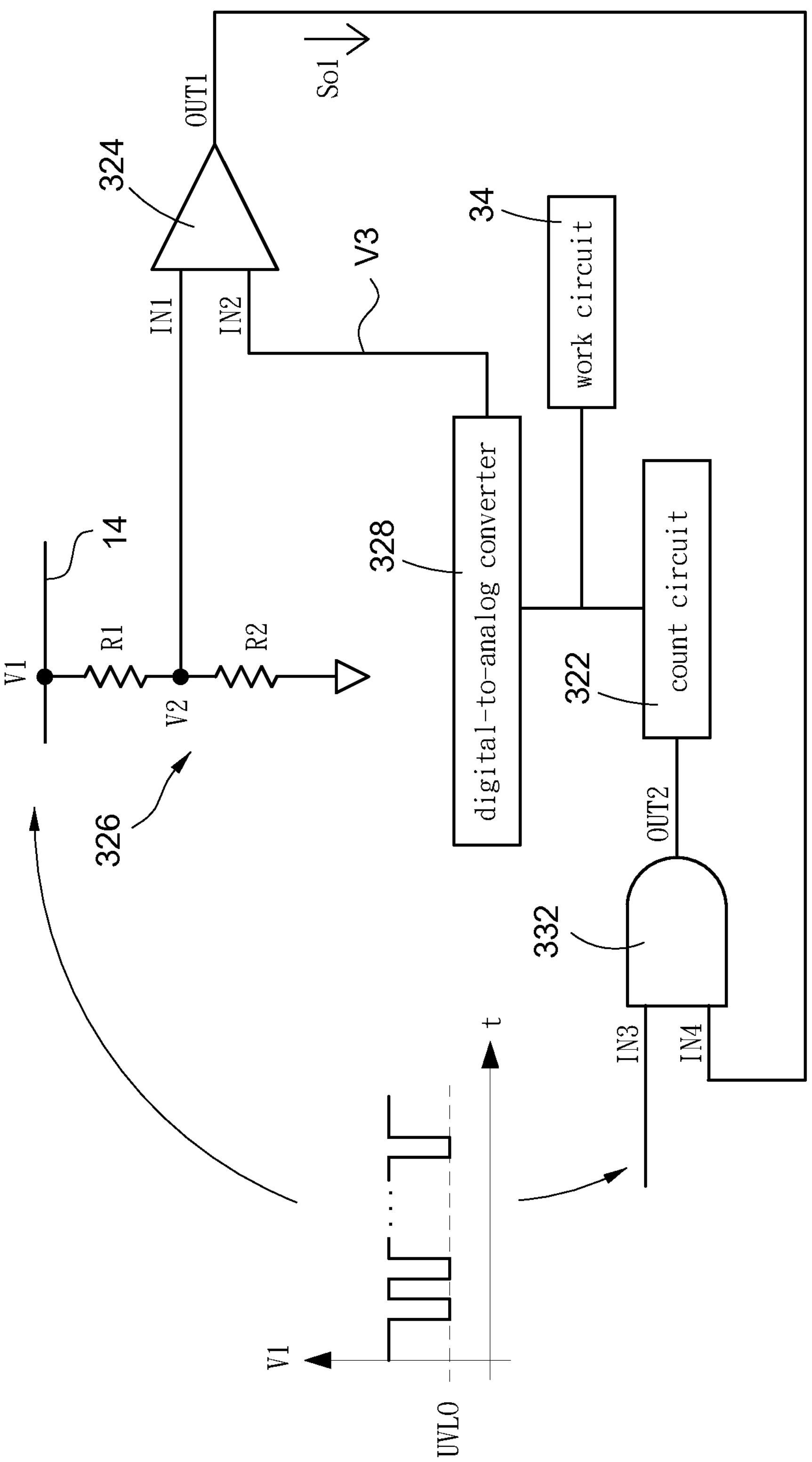
FIG. 2A is a circuit block diagram of a LED circuit with the parallel sequence function according to a first embodiment of the present disclosure.

Please refer to FIG. 2A, which shows a circuit block diagram of a LED circuit with the parallel sequence function according to a first embodiment of the present disclosure, and also refer to FIG. 1A to FIG. 1E. In FIG. 2A, the input power source Pin is a pulse cluster power source with a specific frequency. The constant current provided by the pulse power source flows through the wire resistance Rl to generate a first specific voltage V1 with the specific frequency, and the waveform of the first specific voltage V1 may be a pulse cluster composed of a plurality of pulse waves. The comparison circuit 34 is an analog comparator, and the sequence circuit 32 further includes a voltage-dividing circuit 326 and a digital-to-analog converter 328. The voltage-dividing circuit 326 is coupled to the power wire 1 and a first input terminal IN1 of the comparison circuit 324. The voltage-dividing circuit 326 receives the first specific voltage V1, divides the first specific voltage V1 into a second specific voltage V2, and provides the second specific voltage V2 to the first input terminal IN1. For example, the voltage-dividing circuit 326 includes a first resistor R1 and second resistor R2 connected in series. A first terminal of the first resistor R1 is coupled to the positive power wire 14, and a second terminal of the first resistor R1 is coupled to the first input terminal IN1. The second specific voltage V2 is generated at a node between the first resistor R1 and the second resistor R2 by dividing the first specific voltage V1, and the second specific voltage V2 is provided to the first input terminal IN1. The digital-to-analog converter 328 is coupled to the count circuit 322 and a second input terminal IN2 of the comparison circuit 324. The digital-to-analog converter 328 performs a digital-to-analog conversion to convert the value of counting the pulse waves of the pulse cluster into a third specific voltage V3.

The comparison circuit 324 compares the second specific voltage V2 with the third specific voltage V3. When the third specific voltage V3 and the second specific voltage V2 cause a first output signal Sol outputted from a first output terminal OUT1 of the comparison circuit 324 to transit, it represents that the first specific voltage V1 meets the value of the pulse cluster. Specifically, since each LED circuit 3 is affected by its own sequence, when a constant current flows through the corresponding wire resistance Rl, the received first specific voltage V1 is generated and sequentially decreased (for example, but not limited to, 5V, 4.75V, 4.5V, . . . etc.) according to the sequence of each LED circuit 3. Therefore, the second specific voltage V2 will also decrease sequentially according to the sequence of the LED circuits 3. On the other hand, the value accumulated by the count circuit 322 is converted into the third specific voltage V3 through the digital-to-analog converter 328. In particular, a linear relationship is between the accumulated value of the count circuit 22 and the third specific voltage V3 (for example, but not limited to, 2.5V, 2.25V, 2V, . . . etc.), and in one embodiment, the linear relationship is a linear relationship with a specific slope that is negative (such as, but not limited to, the slope of −1). In addition, the sequence of each LED circuit 3 of the LED light string 100 and the second specific voltage V2 (for example, but not limited to, 2.75V, 2.5V, 2.25V, . . . etc.) generated by its voltage-dividing circuit 326 is also a linear relationship, and the voltage slope is basically the same as the specific slope (that is, the voltage slope is also −1).

On the other hand, the sequence circuit 32 further includes an and circuit 332, and the and circuit 332 includes a third input terminal IN3, a fourth input terminal IN4, and a second output terminal OUT2. The third input terminal IN3 receives the first specific voltage V1, the fourth input terminal IN4 is coupled to the first output terminal OUT1 of the comparison circuit 324, and the second output terminal OUT2 is coupled to the count circuit 322. The first specific voltage V1 is simultaneously provided to the voltage-dividing circuit 326 and the third input terminal IN3. When the third specific voltage V3 and the second specific voltage V2 of the LED circuit 3 does not cause the first output signal Sol outputted from the first output terminal OUT1 to transit, it represents that the value accumulated by the count circuit 322 does not meet the sequence of the LED circuit 3, and the LED circuit 3 has not yet acquired the correct sequence number. In this condition, the first output signal Sol and the first specific voltage V1 are at the same voltage level (for example, but not limited to, a high level, but the voltage values thereof may be different). Therefore, the and circuit 332 generates, for example, but not limited to, a logic signal with a high level because of the first output signal Sol and the first specific voltage V1 having the same voltage level, and transmits the logic signal to the count circuit 322 through the second output terminal OUT2 so that the count circuit 322 continues counting based on the logic signal with the high level.

On the contrary, when the third specific voltage V3 and the second specific voltage V2 of the LED circuit 3 cause the first output signal Sol outputted from the first output terminal OUT1 to transit, it represents that the value accumulated by the count circuit 322 meets the sequence of the LED circuit 3, and the LED circuit 3 has acquired the correct sequence number. In this condition, the first output signal Sol outputted from the comparison circuit 324 transits so that the first output signal Sol and the first specific voltage V1 are at different voltage levels. Therefore, the and circuit 332 generates, for example, but not limited to, a logic signal with a low level because of the first output signal Sol and the first specific voltage V1 having different voltage levels, and transmits the logic signal to the count circuit 322 through the second output terminal OUT2 so that the count circuit 322 stops counting based on the logic signal with the low level. In addition, in one embodiment, the and circuit 332 may be an AND gate (shown in FIG. 2A) or an and operation circuit composed of electronic components (not shown).

An output terminal of the count circuit 322 is coupled to the work circuit 34 so that when the count circuit 322 stops counting due to the logic signal with the low level, the sequence circuit 32 sets the accumulated value of counting the pulse waves (for example, but not limited to, 3 pulse waves) when counting is stopped as the sequence number of the LED circuit 3, and the set sequence number is stored in the work circuit 34 so that the work circuit 34 performs a specific lighting behavior on its own LED module 342 according to the sequence number of the LED circuit 3. In one embodiment, the transition of the comparison circuit 324 may be from a high level to a low level, and the and circuit 332 may correspondingly be a NAND gate. Therefore, in one embodiment, the internal structure of the sequence circuit 32 may be adjusted accordingly based on the spirit of the present disclosure and the common knowledge of those skilled in the art.

Figure 2B:
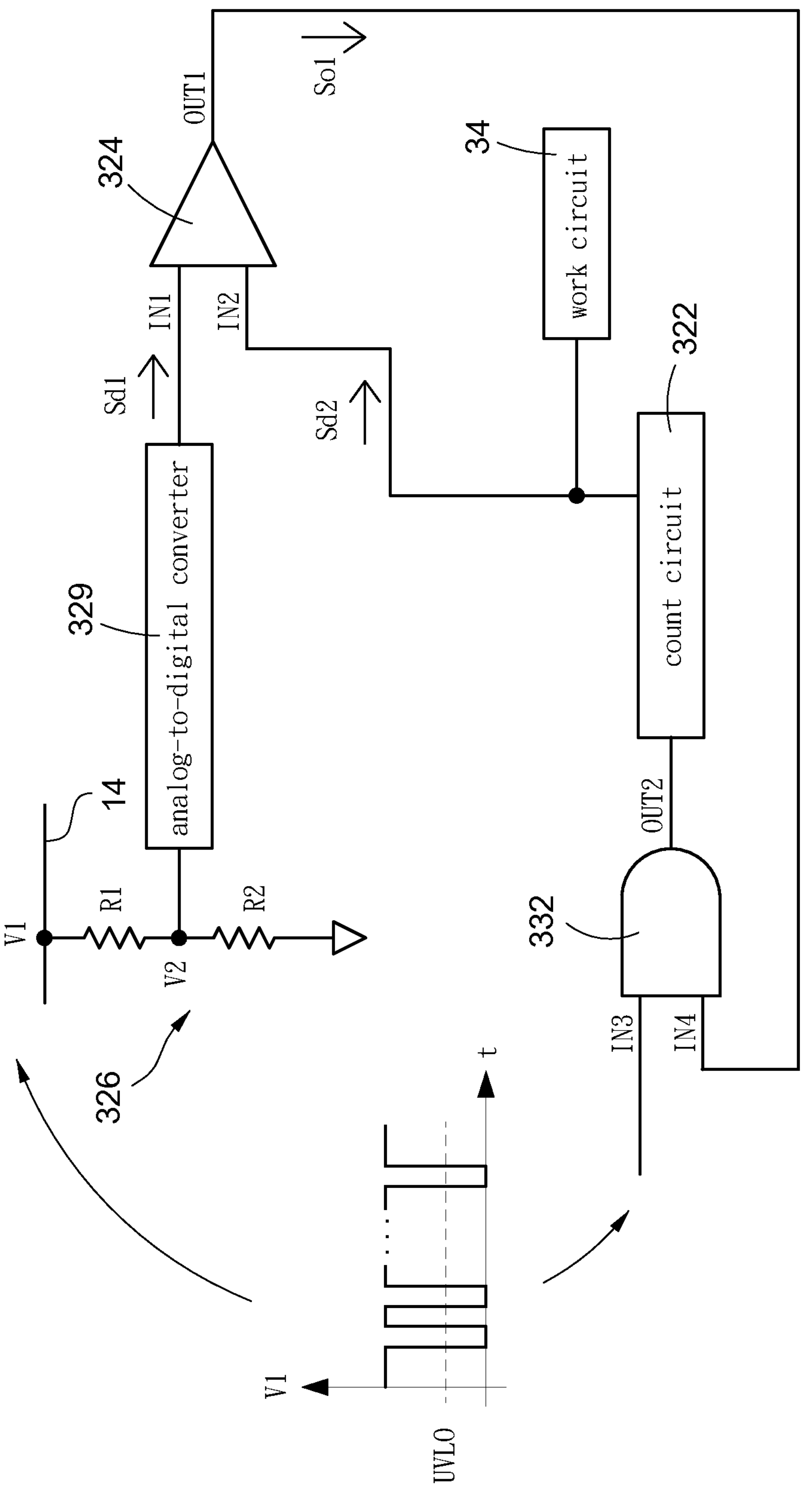
FIG. 2B is a circuit block diagram of the LED circuit with the parallel sequence function according to a second embodiment of the present disclosure.

Please refer to FIG. 2B, which shows a circuit block diagram of the LED circuit with the parallel sequence function according to a second embodiment of the present disclosure, and also refer to FIG. 1A to FIG. 2A. In FIG. 2B, the comparison circuit 324 is a digital comparator, and the sequence circuit 32 further includes a voltage-dividing circuit 326 and an analog-to-digital converter 329. The structure and operation of the voltage-dividing circuit 326 shown in FIG. 2B are the same as those in FIG. 2A and will not be described again here. The analog-to-digital converter 329 is coupled to the voltage-dividing circuit 326 and the first input terminal IN1 of the comparison circuit 324, and the analog-to-digital converter 329 performs an analog-to-digital conversion to convert the second specific voltage V2 into a first digital signal Sd1. The comparison circuit 324 compares the first digital signal Sd1 with a second digital signal Sd2 corresponding to the accumulated value of counting the pulse waves. When the second digital signal Sd2 and the first digital signal Sd1 cause the first output signal Sol outputted from the first output terminal OUT1 of the comparison circuit 324 to transit, it represents that the first specific voltage V1 meets the value of the pulse cluster.

When the second digital signal Sd2 (for example, but not limited to, logic 111) and the first digital signal Sd1 (for example, but not limited to, logic 110) of the LED circuit 3 does not cause the first output signal Sol outputted from the first output terminal OUT1 to transit, it represents that the value accumulated by the count circuit 322 does not meet the sequence of the LED circuit 3, and the LED circuit 3 has not yet acquired the correct sequence number. In this condition, the first output signal Sol and the first specific voltage V1 are at the same voltage level (for example, but not limited to, a high level, but the voltage values thereof may be different). On the contrary, when the first digital signal Sd1 (for example, but not limited to, logic 101) and the second digital signal Sd2 (for example, but not limited to, logic 110) of the LED circuit 3 cause the first output signal Sol outputted from the first output terminal OUT1 to transit, it represents that the value accumulated by the count circuit 322 meets the sequence of the LED circuit 3, and the LED circuit 3 has acquired the correct sequence number. In this condition, the first output signal Sol outputted from the comparison circuit 324 transits so that the first output signal Sol and the first specific voltage V1 are at different voltage levels. In particular, the coupling relationship and operation of the and circuit 332 are the same as those in FIG. 2A and will not be described again. Similarly, the output terminal of the count circuit 322 may be coupled to the work circuit 34 for the same reason as in FIG. 2A, which will not be described again here.

Figure 2C:
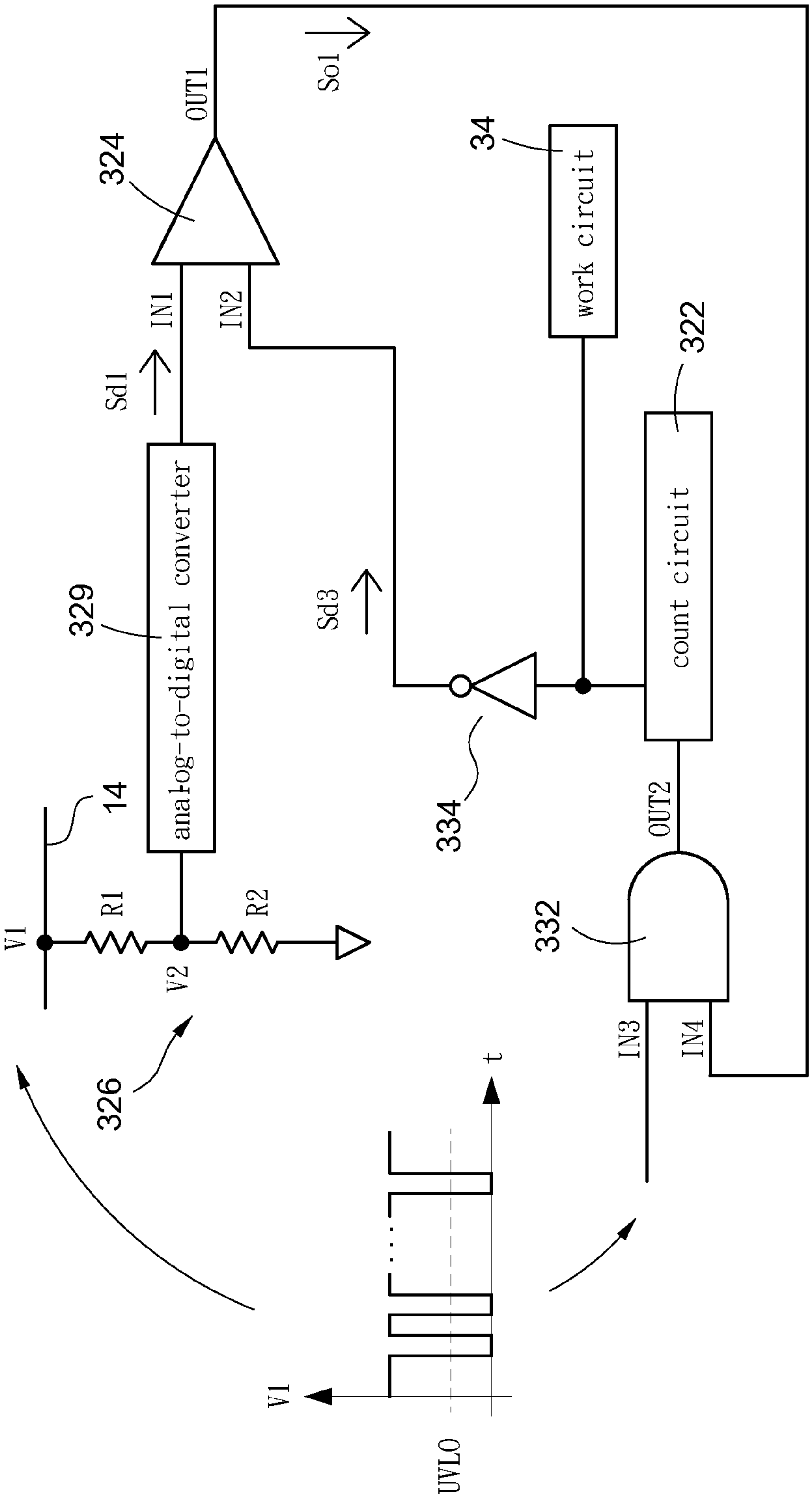
FIG. 2C is a circuit block diagram of the LED circuit with the parallel sequence function according to a third embodiment of the present disclosure.

Please refer to FIG. 2C, which shows a circuit block diagram of the LED circuit with the parallel sequence function according to a third embodiment of the present disclosure. The sequence circuit 32 further includes a reverse circuit 334. The reverse circuit 334 is coupled to the count circuit 322 and the second input terminal IN2 of the comparison circuit 324, and the reverse circuit 334 is used to reverse the second digital signal Sd2 into the third digital signal Sd3. When the third digital signal Sd3 and the first digital signal Sd1 cause the first output signal Sol to transit, it represents that the first specific voltage V1 meets the accumulated value of counting the pulse waves. Specifically, the count circuit 322 includes a forward output terminal and a reverse output terminal. At the beginning of counting (for example, the first pulse wave), the reverse output terminal of the count circuit 322 outputs a digital signal with a low logic (for example, but not limited to, logic 001). On the contrary, the reverse output terminal of the count circuit 322 outputs a reversed first digital signal Sd1 (for example, but not limited to, logic 110). Since the counter circuit 322 usually uses the reverse output terminal to couple to the second input terminal IN2 of the comparison circuit 324 so that the first digital signal Sd1 and the second specific voltage V2 are logically corresponding. However, if the count circuit 322 does not have a reverse output terminal, an external reverse circuit 334 may be coupled between the count circuit 322 and the second input terminal IN2 of the comparison circuit 324 to reverse the logic signal with the low level into the first digital signal Sd1.

Optionally, the input power source Pin (i.e., the pulse power source) may be an adjustable power source with adjustable pulse amplitude. When the input power source Pin is an adjustable power source, the LED light string 100 can change the current flowing through the wire resistance Rl by adjusting the amplitude of the pulse wave, and therefore a wire resistance voltage Vr generated on the wire resistance Rl can be adjusted accordingly. Since the wire resistance voltage Vr can be changed, the first specific voltage V1 acquired by each LED circuit 3 will also change. When the voltage difference between the first specific voltage V1 of each LED circuit 3 is larger due to the increased wire resistance voltage Vr, the sequence circuit 32 can more easily determine the accurate sequence number. On the contrary, when the wire resistance voltage Vr becomes smaller, the power consumption of the LED light string 100 is less, and the power consumption of the LED light string 100 can be saved.

Furthermore, since each type of LED light string 100 may use different wires, lamp spacing, or lamp numbers (and the impedance of each wire resistor Rl may be different), the power setting circuit 2 may preferably be an adjustable control circuit with adjustable impedance to receive a control command to set power parameters of the power setting circuit 2 (such as, but not limited to, a resistance of a resistor or a value of current source). When the power setting circuit 2 is an adjustable control circuit, the internal power parameters of the power setting circuit 2 are adjusted to adjust the current flowing through the wire resistor Rl, which can also change the wire resistance voltage Vr. Therefore, even if the resistance of each wire resistor Rl is not the same (that is, it is roughly equal, but there is still a slight difference), by adjusting the current flowing through the wire resistor Rl, by adjusting the current flowing through the wire resistance Rl, the influence caused by the different resistances of the wire resistors R1 can be reduced.

Figure 2D:
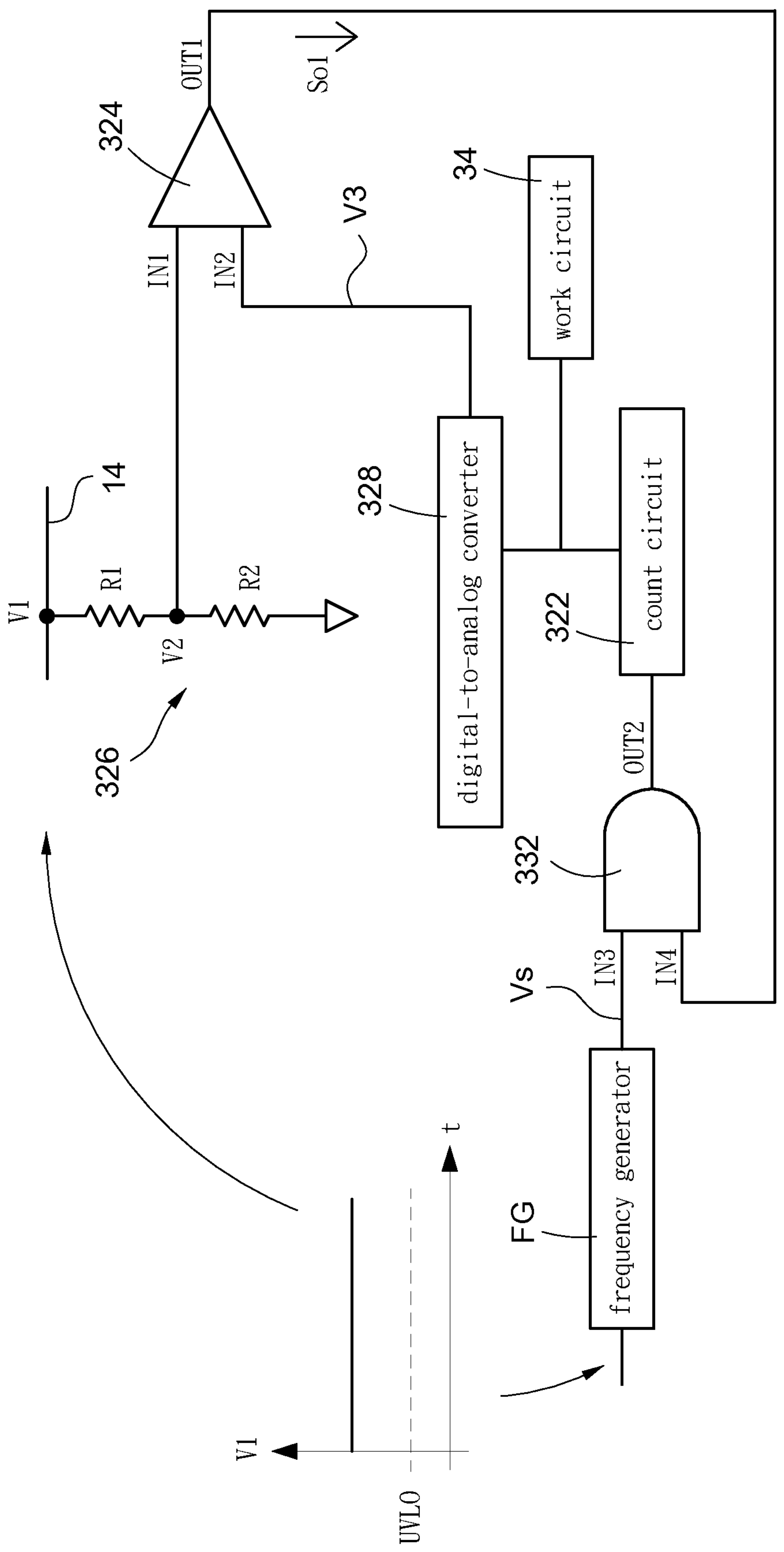
FIG. 2D is a circuit block diagram of the LED circuit with the parallel sequence function according to a fourth embodiment of the present disclosure.

Please refer to FIG. 2D, which shows a circuit block diagram of the LED circuit with the parallel sequence function according to a fourth embodiment of the present disclosure, and also refer to FIG. 1A to FIG. 2A. In FIG. 2D, the input power Pin is a DC voltage with a voltage value that is substantially constant, and the LED circuit 3 further includes a frequency generator FG. The frequency generator FG is coupled to the count circuit 322, and receives the first specific voltage V1. The DC voltage passes through the wire resistor R1 and generates the first specific voltage V1 with a DC voltage in the sequence circuit 32. The frequency generator FG generates a pulse cluster with a specific frequency, and the pulse cluster includes a plurality of pulse waves, and the frequency generator FG provides the pulse cluster to the count circuit 322. In addition to the above-mentioned first specific voltage V1 of receiving DC, the frequency generator 322 may also be coupled to an oscillator (not shown) in the LED circuit 3, and after receiving an oscillation frequency provided by the oscillator, the frequency generator 322 generates the pulse cluster after dividing the oscillation frequency.

In particular, if the sequence circuit 32 includes the and circuit 332, the pulse cluster may be provided to the third input terminal IN3. In one embodiment, the frequency generator FG is usually arranged in the work circuit 34, preferably in the drive circuit 344, and is mainly used to generate a working clock signal through oscillation. In the present disclosure, the oscillation characteristic of the frequency generator FG is utilized to oscillate the first specific voltage V1 with the DC voltage into the pulse cluster in the sequence mode.

In particular, the implementations of FIG. 2A and FIG. 2B are more suitable for the circuit structure of the embodiment of FIG. 1B. The main reason is that in the sequence mode, the work circuit 34 does not need to operate, and there is no need to supply power to it to increase power consumption. On the contrary, the implementation of FIG. 2C is more suitable for the circuit structure of the embodiment of FIG. 1C. The main reason is that in the sequence mode, the work circuit 34 needs to be supplied power to enable the frequency generator FG inside the work circuit 34. However, this does not mean that the implementations of FIG. 2A and FIG. 2B cannot be applied to the circuit structure of FIG. 1C (the same is true for FIG. 2C).

Figure 3A:
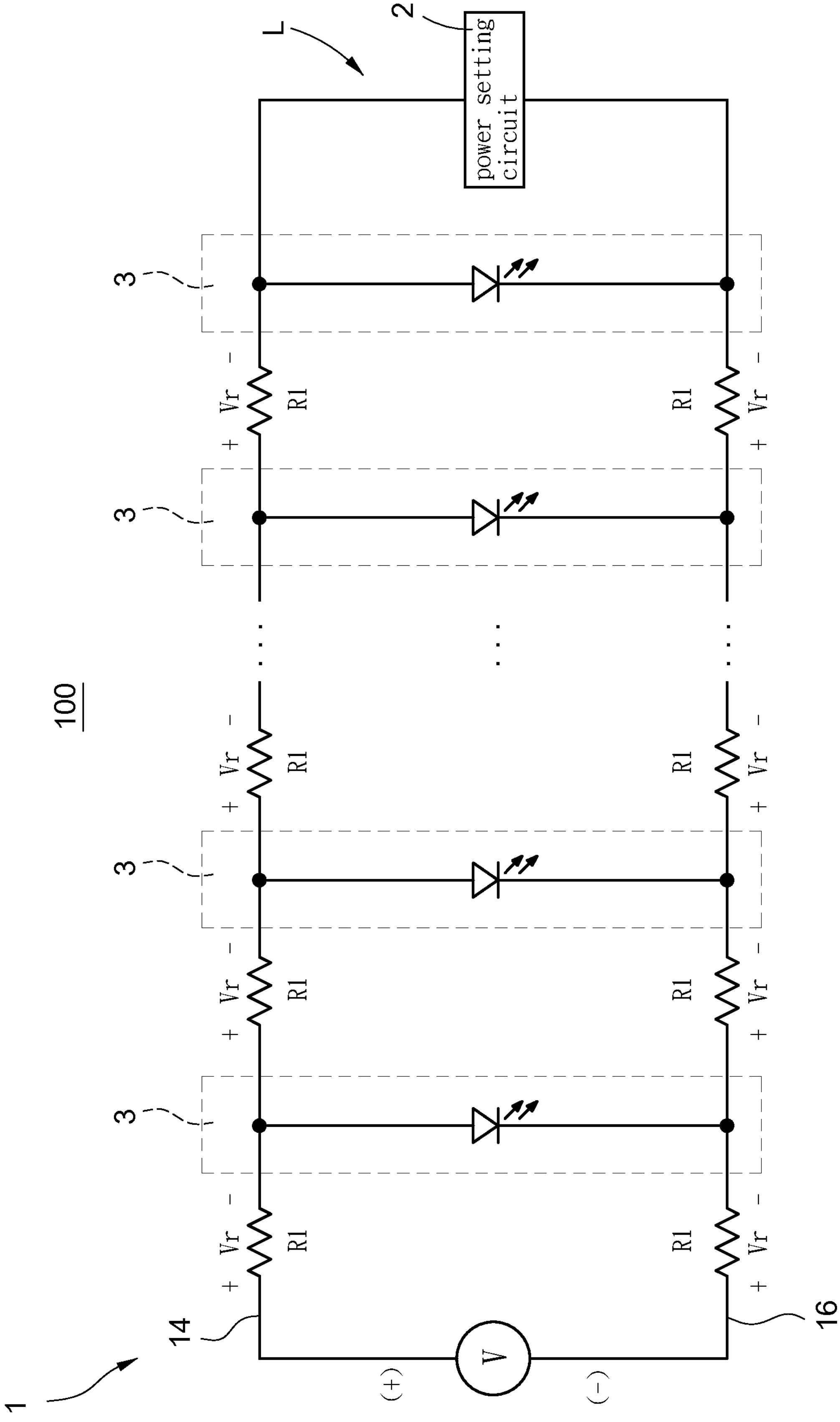
FIG. 3A is a circuit block diagram of the LED light string according to a first embodiment of the present disclosure.
Figure 3B:
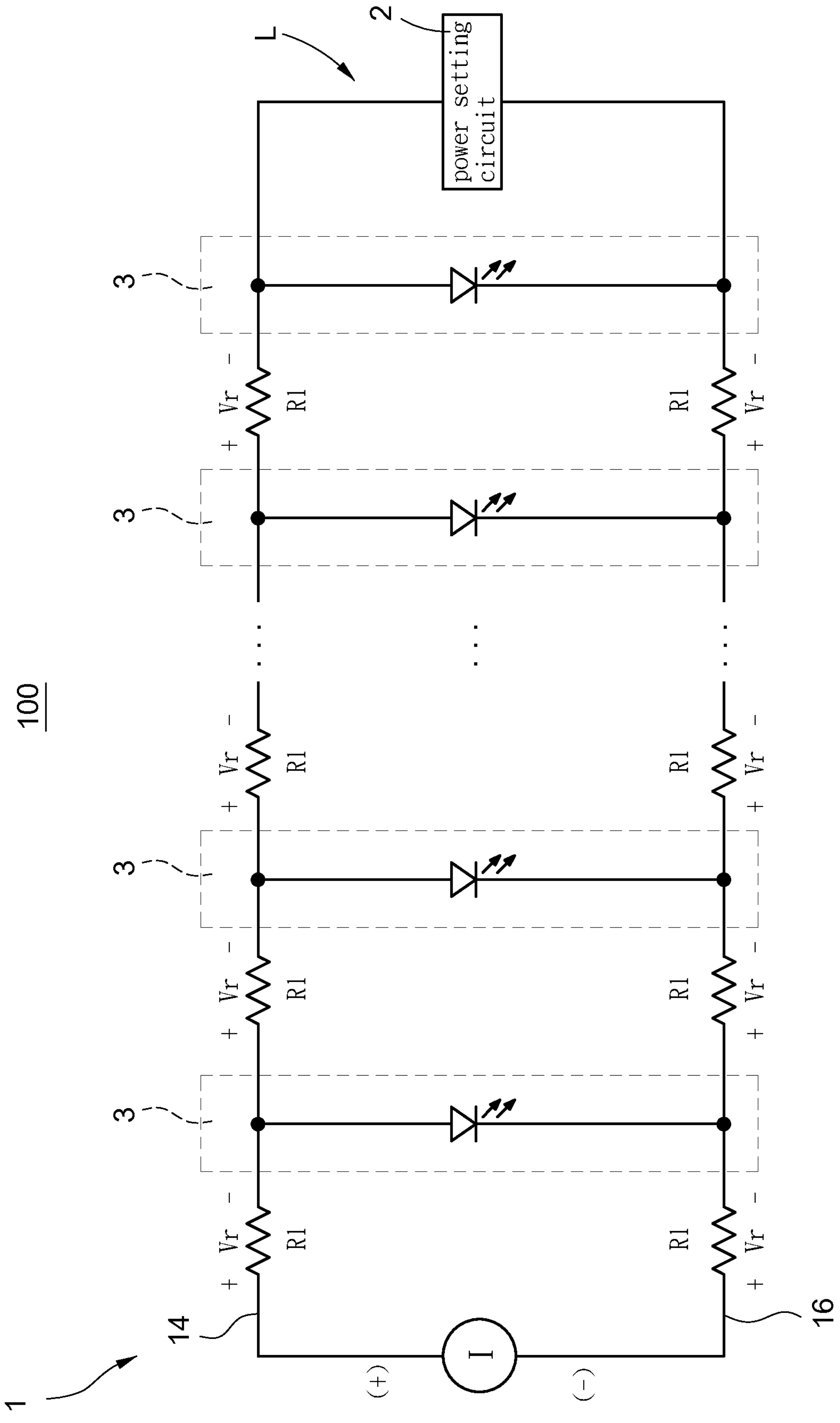
FIG. 3B is a circuit block diagram of the LED light string according to a second embodiment of the present disclosure.

Please refer to FIG. 3A, which shows a circuit block diagram of the LED light string according to a first embodiment of the present disclosure; please refer to FIG. 3B, which shows a circuit block diagram of the LED light string according to a second embodiment of the present disclosure, and also refer to FIG. 1A to FIG. 2D. In FIG. 3A, the input power source Pin is a voltage source V (which may be a DC voltage with pulse waves or a DC voltage with a fixed value. The power setting circuit 2 can add a controllable load to the constant current circuit so that the input power source Pin can continuously flow from the positive electrode (+) to the negative electrode (−) through the power setting circuit 2, and achieve the constant current control. In FIG. 3B, the input power source Pin is a current source I (which may be a DC current with pulse waves or a DC current with a fixed value. The power setting circuit 2 can add a controllable load to the constant voltage circuit so that the input power source Pin can continuously flow from the positive electrode (+) to the negative electrode (−) through the power setting circuit 2, and achieve the constant voltage control.

Figure 3C:
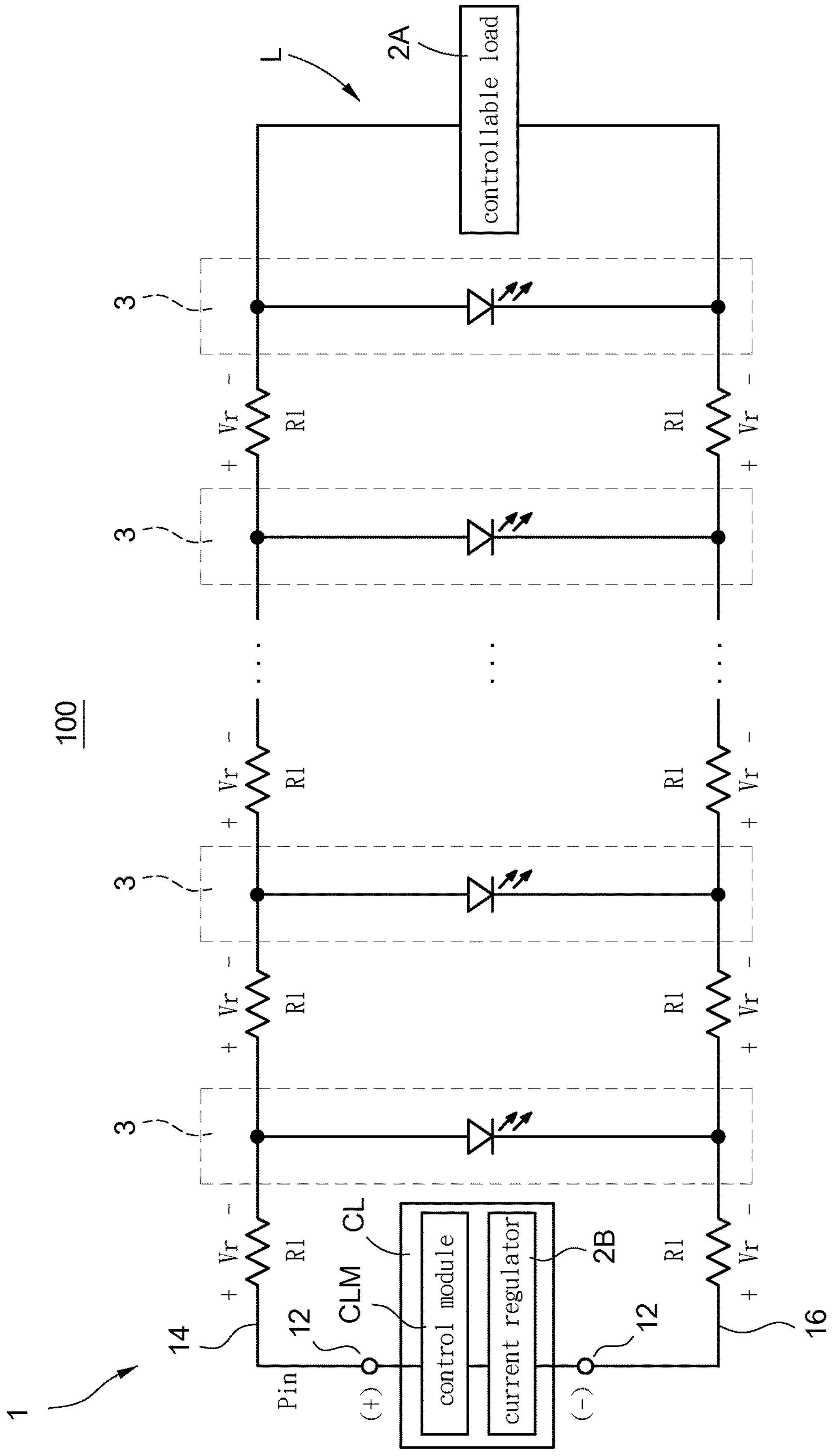
FIG. 3C is a circuit block diagram of the LED light string according to a third embodiment of the present disclosure.
Figure 3D:
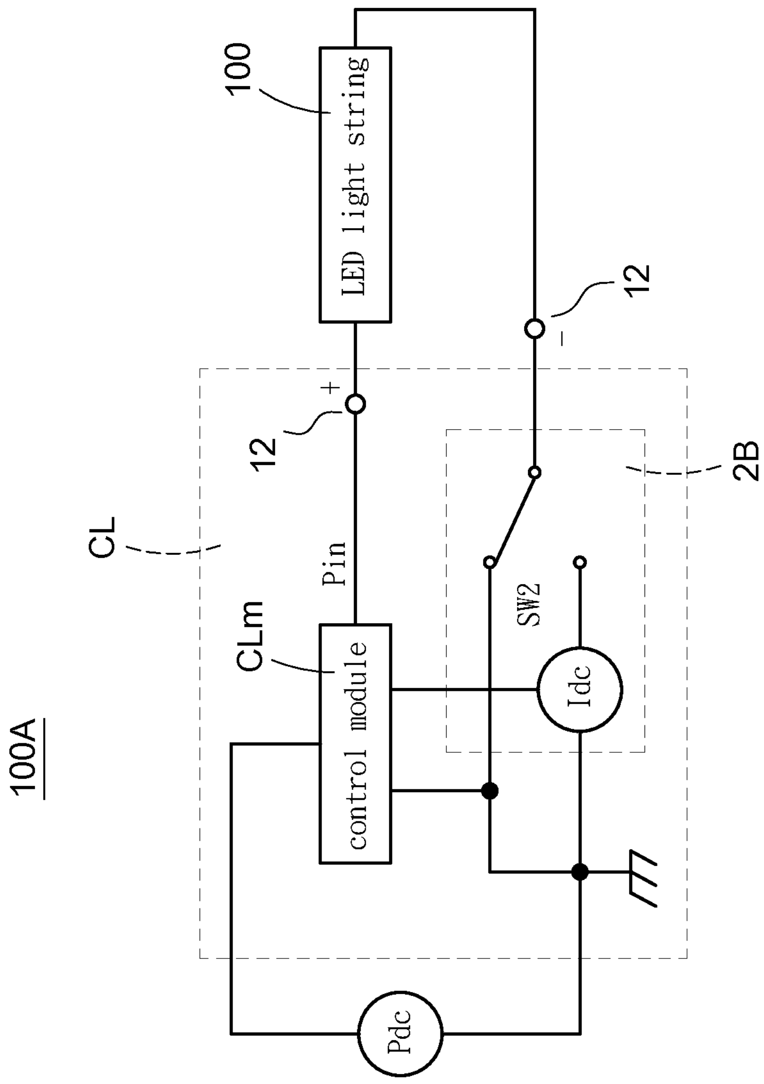
FIG. 3D is a circuit block diagram of the LED light string with the parallel sequence function according to a third embodiment of the present disclosure.

Please refer to FIG. 3C, which shows a circuit block diagram of the LED light string according to a third embodiment of the present disclosure; please refer to FIG. 3D, which shows a circuit block diagram of the LED light string with the parallel sequence function according to a third embodiment of the present disclosure, and also refer to FIG. 1A to FIG. 2C. The difference between FIG. 3C and the FIG. 2A to FIG. 3B is that the constant current circuit of the power setting circuit 2 is separated from a controllable load 2A and becomes part of the controller CL. A simpler implementation of the controllable load 2A may consist of a resistor and a switch. After the LED light string control system 100A determines the wire resistors Rl, the controller CL can provide a command to turn on the controllable load 2A in the sequence mode and turn off the controllable load 2A in the work mode.

As shown in FIG. 3D, a constant current circuit Idc and a switch SW2 can form a current regulator 2B. In the sequence mode, the switch SW2 is turned on, and the constant current circuit Idc is coupled to the negative electrode (−) so that the input power source Pin can continuously flow from the positive electrode (+) through the controllable load 2A and the negative electrode (−) to the constant current circuit Idc, and achieve the constant current control. On the contrary, in the work mode, the switch SW is turned on, and a work module CLm is coupled to the negative electrode (−). The work module CLm starts to generate a lighting command with a sequence number and transmits the lighting command to the LED light string 100 in the form of carrier power via the power wire 1 and the input terminal 12. In this condition, each LED circuit 3 controls the LED module 342 to perform a specific lighting behavior according to the lighting command corresponding to the stored sequence number. In one embodiment, when the input power source Pin is a constant current source, the current regulator 2B may be replaced by a voltage regulator, and the voltage regulator includes a constant voltage circuit and a switch SW2, whose actions and operations are similar to those described in FIG. 3C and FIG. 3D, and this will not be described again.

Accordingly, the function of the power setting circuit 2 is mainly used to enable the LED light string 100 to generate a constant current in the sequence mode. When the wire resistor R1 or the resistance value of the wire impedance (i.e., the wire resistance Rl plus the resistance of the resistor R) is fixed, the first specific voltage V1 sufficient to be identifiable by the sequence circuit 32 of each LED circuit 3 can be generated. The implementation can be divided into two implementations: a constant power regulator 2 shown in FIG. 1B and the current regulator 2B plus the controllable load 2A shown in FIG. 3C. In particular, in FIG. 3C, the current regulator 2B needs to plus the controllable load 2A to completely form the constant power regulator 2.

Figure 3E:
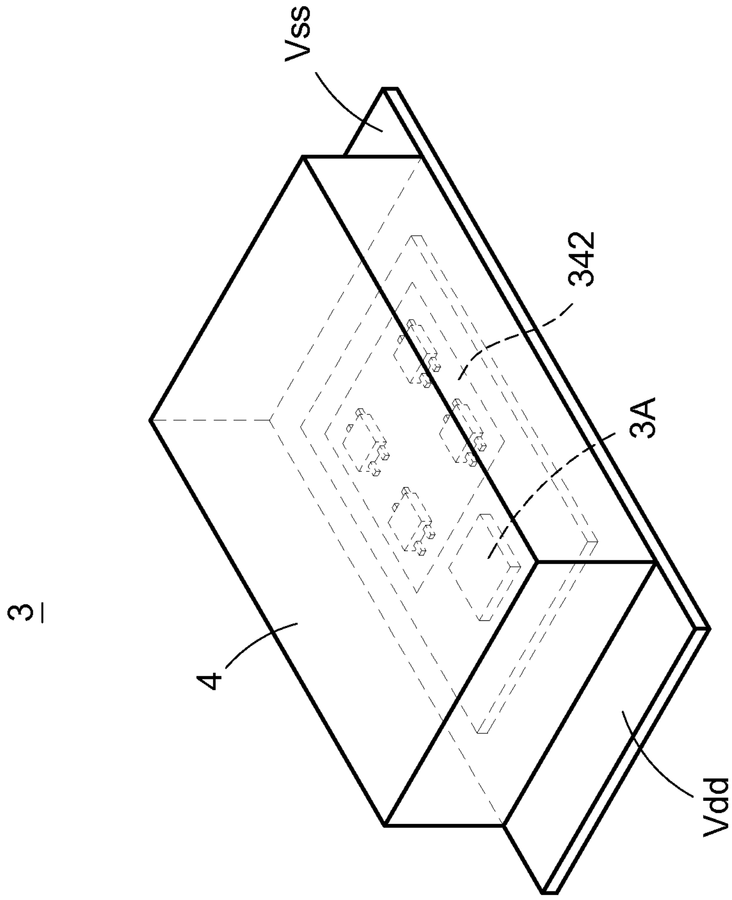
FIG. 3E is a schematic diagram of a packaging structure of the LED circuit according to the present disclosure.

Please refer to FIG. 3E, which shows a schematic diagram of a packaging structure of the LED circuit according to the present disclosure, and also refer to FIG. 1A to FIG. 3D. In FIG. 3E, the LED circuit 3 is packaged in the entire package 4. The sequence circuit 32 and the work circuit 34 may be integrated into a single control chip to form the control module 3A to perform the above-mentioned operations in the sequence mode and the work mode. The LED module 342 includes a plurality of LEDs, and the two power pins Vdd, Vss of the package 4 can be coupled to the positive power wire 14 and the negative power wire 16 of the power wire 1 respectively. Therefore, referring to FIG. 1B, each LED circuit 3 in the LED light string 100 can be packaged in the entire package 4 to form a complete LED lamp, and the sequence circuit 32 and the work circuit 34 can receive the input power source Pin through the power pins Vdd, Vss.

Please refer to FIG. 1A to FIG. 3E, each LED circuit 3 may include a memory unit (such as, but not limited to, a memory) inside, and the memory unit may be a volatile memory unit or a non-volatile memory unit. If the memory unit is the volatile memory unit, the data in the memory unit will be cleared when the power value of the input power source Pin is too low (for example, but not limited to, as low as under voltage lockout (UVLO). Therefore, the power value of the input power source Pin cannot be lower than the under voltage lockout UVLO (as shown in FIG. 2A), and the LED light string 100 must be re-sequenced when the input power Pin is connected every time. On the contrary, if the memory unit is the non-volatile memory unit, even if the input power source Pin is low (as shown in FIG. 2B, the input power source Pin may be 0), the data in the memory unit will not be cleared. Therefore, unless a certain LED circuit 3 inside the LED light string 100 does not have a correct sequence number (for example, but is not limited to, the correct sequence number is replaced or erased), the LED light string 100 does not need to be re-sequenced. In one embodiment, the count circuit 322 of the LED circuit 3 may preferably perform numerical calculations after the pulse wave stabilizes on the rising edge. Therefore, it is possible to avoid the influence of noise or overshoot from affecting the counting of the count circuit 322 when the pulse wave transitions from a low level to a high level transiently (i.e., on the rising edge). In particular, the circuit characteristics and operations of FIG. 1A to FIG. 3E may be applied interchangeably and are not limited to the embodiment of a single figure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode circuit with a parallel sequence function, connected to a power wire, the light-emitting diode circuit comprising:

a sequence circuit configured to receive a first specific voltage generated by a wire resistance of the power wire under a sequence mode, and receive a pulse cluster with a specific frequency, wherein the sequence circuit is configured to count accumulated pulse waves of the pulse cluster as a value and determine the value according to the first specific voltage and the pulse cluster, and then set the value to a sequence number of the light-emitting diode circuit.

2. The light-emitting diode circuit as claimed in claim 1, wherein the sequence circuit further comprises:

a count circuit configured to receive the pulse cluster with the specific frequency, and count the accumulated pulse waves of the pulse cluster as the value, and a comparison circuit coupled to the count circuit, wherein when the first specific voltage meets the value, the comparison circuit is configured to control the count circuit to stop counting, and the sequence circuit sets the value when counting is stopped as the sequence number.

3. The light-emitting diode circuit as claimed in claim 2, wherein the sequence circuit further comprises:

a voltage-dividing circuit coupled to the power wire and a first input terminal of the comparison circuit, and the voltage-dividing circuit configured to divide the first specific voltage into a second specific voltage, and provide the second specific voltage to the first input terminal, and a digital-to-analog converter coupled to the count circuit and a second input terminal of the comparison circuit, and the digital-to-analog converter configured to perform a digital-to-analog conversion to convert the value into a third specific voltage, wherein the comparison circuit is configured to compare the second specific voltage with the third specific voltage, and when the third specific voltage and the second specific voltage cause a first output signal outputted from a first output terminal of the comparison circuit to transit, the first specific voltage meets the value.

4. The light-emitting diode circuit as claimed in claim 3, wherein a linear relationship is between the value and the third specific voltage, and the digital-to-analog converter is configured to perform the digital-to-analog conversion according to the linear relationship.

5. The light-emitting diode circuit as claimed in claim 2, wherein the sequence circuit further comprises:

a voltage-dividing circuit coupled to the power wire, and configured to divide the first specific voltage into a second specific voltage, and an analog-to-digital converter coupled to the voltage-dividing circuit and a first input terminal of the comparison circuit, and the analog-to-digital converter configured to perform an analog-to-digital conversion to convert the second specific voltage into a first digital signal, wherein the comparison circuit is configured to compare the first digital signal with a second digital signal, transmitted from the count circuit, corresponding to the value, and when the second digital signal and the first digital signal cause a first output signal outputted from a first output terminal of the comparison circuit to transit, the first specific voltage meets the value.

6. The light-emitting diode circuit as claimed in claim 5, wherein the sequence circuit further comprises:

an and circuit comprising a third input terminal, a fourth input terminal, and a second output terminal; the third input terminal configured to receive the pulse cluster, the fourth input terminal coupled to a first output terminal of the comparison circuit, and the second output terminal coupled to the count circuit, wherein the and circuit is configured to transmit a logic signal through the second output terminal to control the count circuit to continue counting or stop counting according to the first output signal and voltages of the pulse cluster.

7. The light-emitting diode circuit as claimed in claim 6, further comprising:

a frequency generator coupled to the count circuit, and the frequency generator configured to receive the first specific voltage, and generate the pulse cluster comprising a plurality of pulse waves according to the first specific voltage.

8. The light-emitting diode circuit as claimed in claim 5, wherein the sequence circuit further comprises:

a reverse circuit coupled to the count circuit and a second input terminal of the comparison circuit, and configured to reverse a second digital signal, transmitted from the count circuit, corresponding to the value into a third digital signal, and transmit the third digital signal to the second input terminal, and when the third digital signal and the first digital signal cause the first output signal to transit, the first specific voltage meets the value.

9. The light-emitting diode circuit as claimed in claim 2, further comprising:

a work circuit, wherein the light-emitting diode operates in the sequence mode and a work mode; in the work mode, the work circuit is configured to perform a lighting command of a carrier power source according to the value.

10. The light-emitting diode circuit as claimed in claim 9, wherein the work circuit further comprises:

a drive circuit coupled to the count circuit, and the drive circuit configured to receive the lighting command of the carrier power source, wherein in the work mode, the drive circuit is configured to perform the lighting command.

11. The light-emitting diode circuit as claimed in claim 10, further comprising:

a controlled switch coupled to the sequence circuit and the work circuit, wherein in the sequence mode, the controlled switch is turned on to enable the sequence circuit; in the work mode, the controlled switch is turned on the enable the work circuit.

12. The light-emitting diode circuit as claimed in claim 11, wherein the drive circuit further comprises:

a frequency generator; wherein the work circuit is coupled to an input power source, and the input power source is a direct-current voltage;

wherein in the sequence mode, the sequence circuit is coupled to the power wire due to the turning on of the controlled switch, and the frequency generator is configured to generate the pulse cluster according to the direct-current voltage and provide the pulse cluster to the sequence circuit; in the work mode, the sequence circuit is disabled due to the turning off of the controlled switch.

13. The light-emitting diode circuit as claimed in claim 1, further comprising:

a resistor connected to the power wire in series, wherein in the sequence mode, a wire impedance of the power wire is increased to the wire resistance plus a resistance of the resistor to acquire the first specific voltage.

14. The light-emitting diode circuit as claimed in claim 9, further comprising:

a first switch connected to the resistor in parallel, wherein in the sequence mode, the first switch is turned off so that a wire impedance of the power wire is increased to the wire resistance plus a resistance of the resistor to adjust the first specific voltage; in the work mode, the first switch is turned on to bypass the resistor.

15. A light-emitting diode lamp, comprising:

two power pins configured to receive an input power source with a first specific voltage, a plurality of light-emitting diodes coupled to the two power pins, a light-emitting diode circuit coupled to the two power pins and the plurality of light-emitting diodes, and the light-emitting diode circuit is configured to receive the input power source through the two power pins, wherein the light-emitting diode circuit comprises:

a sequence circuit configured to receive a first specific voltage generated by a wire resistance of the power wire under a sequence mode, and receive a pulse cluster with a specific frequency, wherein the sequence circuit is configured to count accumulated pulse waves of the pulse cluster as a value and determine the value according to the first specific voltage and the pulse cluster, and then set the value to a sequence number of the light-emitting diode circuit, and a package configured to package the light-emitting diode circuit, the plurality of light-emitting diodes, and the two power pins, wherein each power pin is partially exposed outside the package.

16. A light-emitting diode light string with a parallel sequence function, comprising:

a power wire comprising an input terminal, a positive power wire, and a negative power wire; the input terminal configured to receive an input power source, and the power wire comprises a wire resistance, a power setting circuit coupled to the power wire, and the power setting circuit configured to provide a path from the input terminal, the positive power wire, and the negative power wire to the input terminal for the input power source, and adjust a current of the input power source to a constant current, and a plurality of light-emitting diode circuits, each light-emitting diode circuit coupled to the power wire and the power setting circuit, wherein each light-emitting diode circuit comprises:

a sequence circuit configured to receive a first specific voltage generated by a wire resistance of the power wire under a sequence mode, and receive a pulse cluster with a specific frequency, wherein the sequence circuit is configured to determine a value according to the first specific voltage and the pulse cluster, and then set the value to a sequence number of the light-emitting diode circuit, wherein in a sequence mode, a plurality of wire resistances are provided between the input terminal and the plurality of light-emitting diode circuits; when the constant current flows through the plurality of wire resistances, a plurality of sequence circuits of the light-emitting diode circuits are respectively receive a plurality of first specific voltages with different voltage magnitudes according to a parallel sequence of the light-emitting diode circuits, and receive the pulse cluster with a specific frequency to compare the first specific voltage with the pulse cluster to correspondingly set a sequence number of the light-emitting diode circuit.

* * * * *